United States Patent
Kabbani et al.

(10) Patent No.: US 9,307,013 B1
(45) Date of Patent: Apr. 5, 2016

(54) REDUCING BATCH COMPLETION TIME IN A COMPUTER NETWORK WITH MAX-MIN FAIRNESS

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 433 days.

(21) Appl. No.: 13/905,353

(22) Filed: May 30, 2013

(51) Int. Cl.
*G06F 15/16* (2006.01)
*H04L 29/08* (2006.01)
*G06F 3/12* (2006.01)
*G06F 9/48* (2006.01)

(52) U.S. Cl.
CPC .............. *H04L 67/10* (2013.01); *G06F 3/1262* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 8,087,023 B2* | 12/2011 | Challenger | G06F 9/5027 709/201 |
| 8,473,951 B2* | 6/2013 | Sharon | G06F 9/4843 718/101 |
| 8,521,841 B2* | 8/2013 | Warren | G06F 17/30522 707/705 |
| 2005/0255254 A1* | 11/2005 | Desie | C09D 11/101 427/565 |
| 2010/0332007 A1* | 12/2010 | Godard | G06Q 10/06 700/102 |
| 2011/0296052 A1 | 12/2011 | Guo et al. | |
| 2013/0003538 A1 | 1/2013 | Greenberg et al. | |
| 2014/0092726 A1 | 4/2014 | Khan et al. | |
| 2015/0134830 A1 | 5/2015 | Popa et al. | |

* cited by examiner

*Primary Examiner* — Azizul Choudhury
(74) *Attorney, Agent, or Firm* — Foley & Lardner LLP; Edward A. Gordon

(57) ABSTRACT

The present disclosure describes a system and method for reducing total batch completion time using a max-min fairness process. In some implementations, the max-min fairness process described herein reduces the batch completion time by collectively routing the batches in a way that targets providing the same effective path capacity across all requests. More particularly, given a network shared by batches of flows, total throughput is increased with max-min fairness (and therefore batch completion time decreased) if the $n^{th}$ percentile fastest flow of a batch cannot increase its throughput without decreasing the $n^{th}$ percentile fastest flow of another batch whose throughput is not greater than the throughput of the first batch.

20 Claims, 8 Drawing Sheets

500

| Batch | Flow Paths | Number of Flows | Bandwidth Allocation/ Flow (Gbps) | E |
|---|---|---|---|---|
| 1 | node 301(1) → node 302(1) → node 301(0) | 10 | 0.05 | 2 |
|   | node 301(2) → node 302(2) → node 301(0) | 10 | 0.05 |   |
| 2 | node 301(0) → node 302(0) → node 301(1) | 10 | 0.05 | 2 |
|   | node 301(2) → node 302(2) → node 301(1) | 10 | 0.05 |   |
| 3 | node 301(0) → node 302(0) → node 301(2) | 10 | 0.05 | 2 |
|   | node 301(1) → node 302(1) → node 301(2) | 10 | 0.05 |   |

*Figure 5A*

| Batch | Flow Paths | Number of Flows | Bandwidth Allocation/ Flow (Gbps) | E |
|---|---|---|---|---|
| 1 | node 301(1) → node 302(1) → node 301(0) | 10 | 0.052 | 2 |
| | node 301(2) → node 302(2) → node 301(0) | 10 | 0.052 | |
| 2 | node 301(0) → node 302(0) → node 301(1) | 9 | 0.052 | 1 |
| | node 301(2) → node 302(2) → node 301(1) | 10 | 0.052 | 2 |
| 3 | node 301(0) → node 302(0) → node 301(2) | 10 | 0.052 | |
| | node 301(1) → node 302(1) → node 301(2) | 10 | 0.052 | |

| Batch | Flow Paths | Number of Flows | Bandwidth Allocation/ Flow (Gbps) | E |
|---|---|---|---|---|
| 1 | node 301(1) → node 302(1) → node 301(0) | 10 | 0.0625 | 2 |
| | node 301(2) → node 302(2) → node 301(0) | 10 | 0.0625 | |
| 2 | node 301(0) → node 302(0) → node 301(1) | 8 | 0.0625 | 0 |
| | node 301(2) → node 302(2) → node 301(1) | 10 | 0.0625 | |
| 3 | node 301(0) → node 302(0) → node 301(2) | 8 | 0.0625 | 0 |
| | node 301(1) → node 302(1) → node 301(2) | 10 | 0.0625 | |

| Batch | Flow Paths | Number of Flows | Bandwidth Allocation/ Flow (Gbps) | E |
|---|---|---|---|---|
| 1 | node 301(1) –node 302(1) –node 301(0) | 9 | 0.1528 | 0 |
|   | node 301(2) –node 302(2) –node 301(0) | 9 | 0.1528 | 0 |
| 2 | node 301(0) –node 302(0) –node 301(1) | 8 | 0.0625 | 0 |
|   | node 301(2) –node 302(2) –node 301(1) | 10 | 0.0625 |   |
| 3 | node 301(0) –node 302(0) –node 301(2) | 8 | 0.0625 | 0 |
|   | node 301(1) –node 302(1) –node 301(2) | 10 | 0.0625 |   |

REDUCING BATCH COMPLETION TIME IN A COMPUTER NETWORK WITH MAX-MIN FAIRNESS

BACKGROUND

Many data center applications are based on a many-to-one communication pattern. The many-to-one communication pattern may be implemented with distributed storage and computation frameworks. In this pattern, a server issues a request for data to a plurality of worker nodes. The server often waits for responses from all of the worker nodes before proceeding to a new process. Waiting for the plurality of responses often means the total completion time of the request (i.e., the length of time from the issuance of the request until the server can proceed to the next process) is dictated by the slowest worker node.

SUMMARY OF THE DISCLOSURE

Aspects and implementations of the present disclosure are directed to systems and methods for achieving increased bandwidth usage and approaching max-min fairness of flow rates in a computer network.

At least one aspect of the disclosure is directed to a system for reducing overall batch completion time of distributed computations. The distributed computations are computed by a plurality of nodes connected by a plurality of data links. The system includes a memory to store processor-executable instructions, and a processing unit coupled to the memory. Execution of the processor-executable instructions by the processing unit causes the processing unit to receive a network topology, a response objective, and batch routing data. The instructions further cause the processor to determine bandwidth throughputs for each of the data links by calculating the number of extra flows contained within each of the plurality of batches. The number of extra flows are calculated responsive to the response objective. The bandwidth throughputs are also determined by calculating a capacity budget for each of a plurality of flows in the plurality of batches and calculating a minimum bandwidth capacity that can be supported by the plurality of data links. The processor also increases a bandwidth allocation for each of the plurality of flows to the determined minimum data capacity. Determining the bandwidth throughputs further includes removing a subset of flows associated with one of the batches. Execution of the processor-executable instructions by the processing unit further cause the processor to update the bandwidth allocations responsive to the removed subset of flows and configure a bandwidth throughput for each of the plurality of data links responsive to the updated bandwidth allocation.

Another aspect of the disclosure is directed towards a computer-implemented method for reducing overall batch completion time of distributed computations. The method includes receiving a network topology, a response objective, and batch routing data. The method further includes determining bandwidth throughputs for each of the data links. The bandwidth throughputs is determined by calculating the number of extra flows for each of the plurality of batches. Determining throughput bandwidths also includes calculating a capacity budget for each of a plurality of flows in the plurality of batches. The method further includes calculating a bandwidth capacity that can be supported by the plurality of data links, and increasing a bandwidth allocation for each of the plurality of flows to the determined bandwidth capacity. Then, a subset of flows associated with one of the batches is removed. Finally, a data throughput for each of the plurality of data links is implemented responsive to the updated bandwidth allocation.

Yet another aspect of the disclosure is directed towards a non-transitory computer readable storage medium having instructions encoded thereon. When the instructions stored on the non-transitory computer readable storage medium are executed by a processor, the processor performs a method for reducing overall batch completion time of distributed computations. The instructions cause the processor to receive a network topology, a response objective, and batch routing data. When executed, the instructions further cause the processor to determine bandwidth throughputs. Bandwidth throughputs are determined by calculating the number of extra flows in each of the plurality of batches, and calculating a capacity budget for each of a plurality of flows. Then, the instructions cause the processor to calculate a bandwidth capacity that can be supported by the plurality of data links and then increase a bandwidth allocation for each of the plurality of flows to the determined bandwidth capacity. The processor then removes a subset of flows associated with one of the batches. Finally, the instructions cause the processor to implement a data throughput for each of the plurality of data links responsive to the updated bandwidth allocation.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIGS. 5A-5D are charts summarizing the parameters calculated at various steps of the method of FIG. 4, according to an illustrative implementation.

DESCRIPTION OF CERTAIN ILLUSTRATIVE IMPLEMENTATIONS

Following below are more detailed descriptions of various concepts related to, and implementations of, systems and methods for reducing overall batch completion time in a computer network using a max-min fairness process. The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes a system and method for reducing total batch completion time using a max-min fairness process. In a distributed computer system, worker nodes often simultaneously return responses to a server node. The responses from all the worker nodes to the server node may be referred to as a batch. In some distributed computer systems, multiple batches traverse a network at any given time, and often the nodes of the network are unaware of other batches traversing the same network. The different batches encounter different effective path capacities as nodes send flows through links that are or become bottlenecked. The max-min fairness process described herein reduces the total batch completion time by collectively routing the batches traversing a network in a way that provides substantially the same effective path capacity across all requests.

Figure 1:
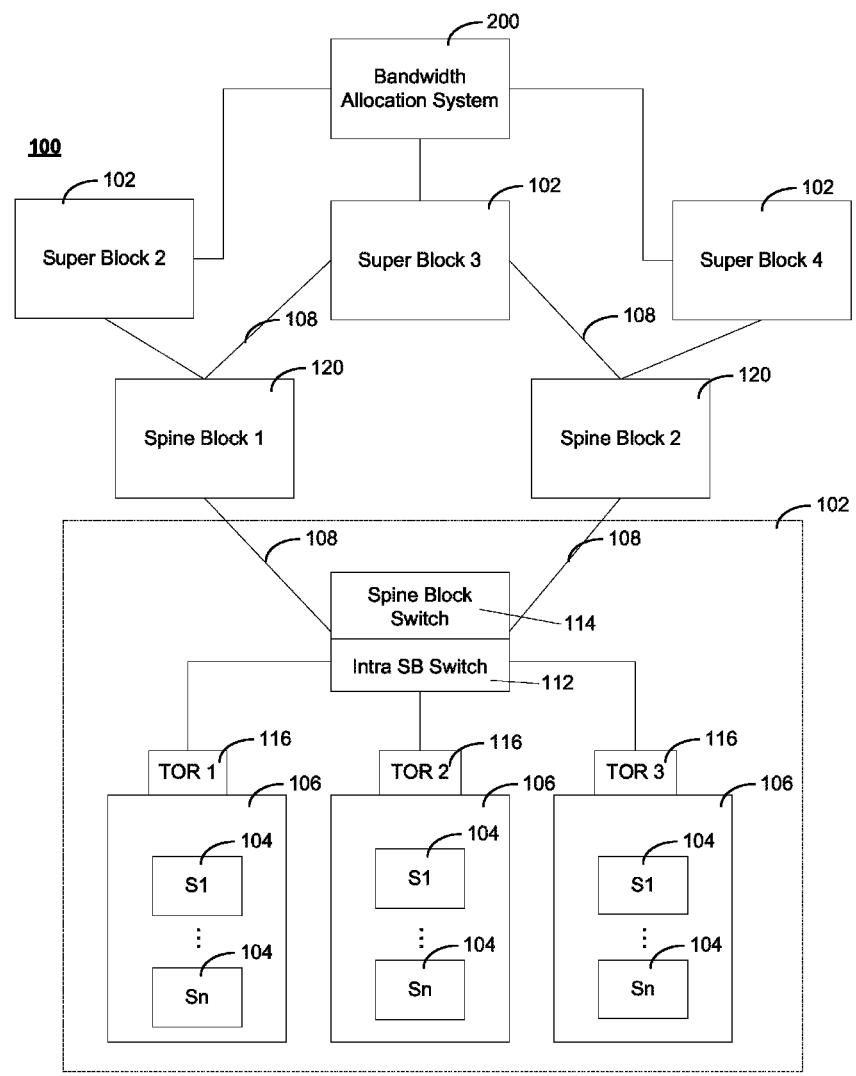
FIG. 1 is a block diagram of a data center, according to an illustrative implementation.

FIG. 1 is a block diagram of an example data center 100. The data center 100 includes several interconnected superblocks 102 (also referred to as "pods"). Each superblock 102 may include many hundred, and in some implementations over one thousand, servers 104 arranged in server racks 106. The superblocks 102 are communicatively coupled to one another by optical and/or electrical communication links 108. They can be connected directly, or through spineblocks 120, which serve as switches for routing data communications between the superblocks 102. The superblock includes an intra superblock switch 112 for routing communications among the racks 106 included in the superblock 102 or to a spineblock switch 114, which routes data communications between superblocks 102 through spineblocks 120. In some implementations, the spineblock switch 114 can be a spineblock or it can be switch within the superblock 102. The data center 100 also includes a bandwidth allocation system 200 that is in communication with each of the superblocks 102 of the data center 100.

This disclosure primarily relates to the case in which superblocks 102 are connected only through spineblocks 120 (i.e., there is no direct connection between the superblocks 102). For example, the data center 100 can be modeled as a computer network consisting of two switch stages: a first switch stage including superblocks 102, and a second switch stage including spineblocks 120. Communication between superblocks 102 is facilitated by the spineblocks 120, and there are no direct connections between any two switches in the same stage. However, the systems and methods described herein can also be applicable to networks in which superblocks 102 and spineblocks 120 communicate directly.

As indicated above, each superblock 102 includes a large number of servers 104. In some implementations, a superblock 102 may include hundreds or more than one thousand servers. The servers 104 are arranged in server racks 106. A top-of-rack (ToR) switch 116 routes data communications between servers 104 within a given rack 106 and from servers within the rack to the intra-superblock switch 112.

The bandwidth allocation system 200 controls how bandwidth is allocated on each of the links 108. As described in relation to FIG. 2, a plurality of flows traverse the links 108 at any given time. The bandwidth allocation system 200 allocates bandwidth to provide a substantially fair transmission time for groups of flows traversing through the data center 100 or other computer network. The bandwidth allocation system 200 can determine the network parameters of the data center 100, generate a network configurations (i.e., bandwidth allocations) to reduce batch completion time, and implement the network configurations. In some implementations, the bandwidth allocation system 200, reduces batch completion time in the data center 100 by a utilizing max-min fairness process. In some of these implementations, the bandwidth allocation system uses a subcategory of the max-min fairness termed max-min tail fairness. Max-min tail fairness is described in relation to the method of FIG. 4. In some implementations, a network configuration based on the max-min fairness process allocates a predetermined bandwidth allocation to each flow traversing the network. For example, after determining the network configuration, the bandwidth allocation system 200 sets rate limiters on superblocks 102 and/or spineblocks 120 to provide substantially max-min fair path capacity across all requests traversing a network.

The bandwidth allocation system 200 can be implemented by special purpose logic circuitry (e.g., a FPGA (field programmable gate array) or an ASIC (application-specific integrated circuit)) and/or a general purpose computing device. The bandwidth allocation system 200 can also include, in addition to hardware, code stored on a computer readable medium that, when executed, causes the bandwidth allocation system 200 to perform one or more of the methods described herein. In some implementations, the bandwidth allocation system 200 is located within the data center 100 or otherwise in communication with the data center 100.

Figure 2:
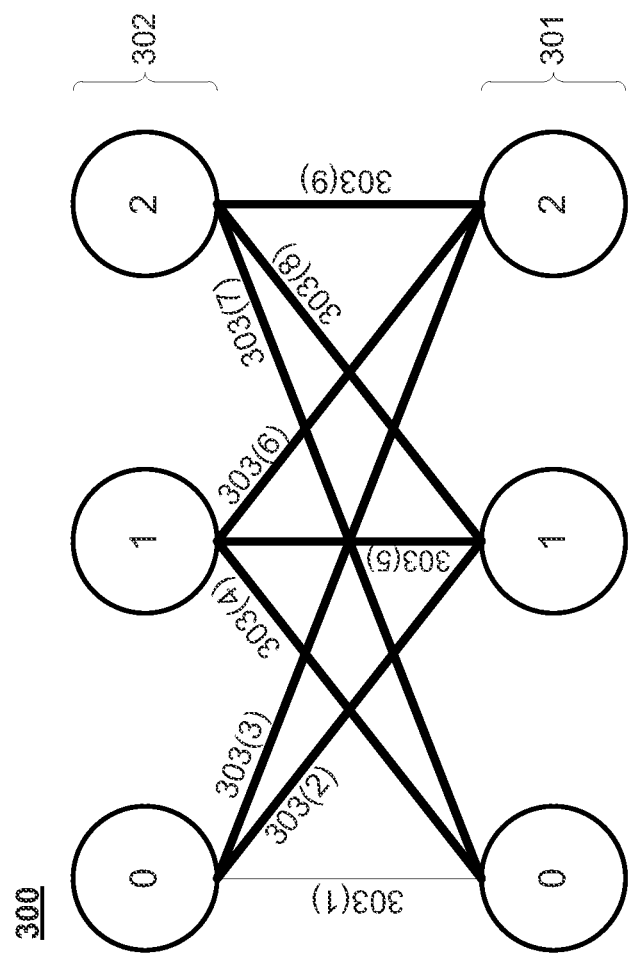
FIG. 2 is a network topology, according to an illustrative implementation.

FIG. 2 is a distributed computer network 300, according to an illustrative implementation. The network 300 includes a plurality of first stage nodes 301(0)-301(2) and a plurality of second stage nodes 302(0)-302(2). The first stage nodes 301 and second stage nodes 302 are connected by a plurality of links 303(1)-303(9). In some implementations, the first stage nodes 301 are the superblocks 102 of the data center 100 and the second stage nodes 302 are the spineblocks 120 of the data center 100. In network 300, the first stage nodes 301 (or superblocks 102) communicate with one another through the second stage nodes 302 (or spineblocks 120). The bandwidth allocation system 200 controls the bandwidth allocated to each of the flows traversing the links 303(1)-303(9).

The network 300 includes an equal number of first stage nodes 301 and second stage nodes 302. The network 300 includes a link 303 between each of the first stage nodes 301 and the second stage nodes 302. Each of the links 303 has a specific bandwidth. The thinner line depicting the link 303 between the first stage node 301(0) and the second stage node 302(0) indicates that the link 303 has a bandwidth capacity less than the bandwidth capacity of the other links 303 in the network 300. In some implementations, the bandwidth capacity of a link 303 may be responsive to network traffic and/or the physical limitations of the network 300. In some implementations, the links 303 are unidirectional and in other implementations the links 303 are bidirectional. Solely for the purposes of describing the examples herein, and not to limit the scope of the disclosure, the links 303(1), 303(5), and 303(9) carry flows from the first stage nodes 301 to the second stage nodes 302, and 303(2), 303(3), 303(4), 303(6), 303(7), and 303(8) carry flows form the second stage nodes 302 to the first stage nodes 301.

Figure 3:
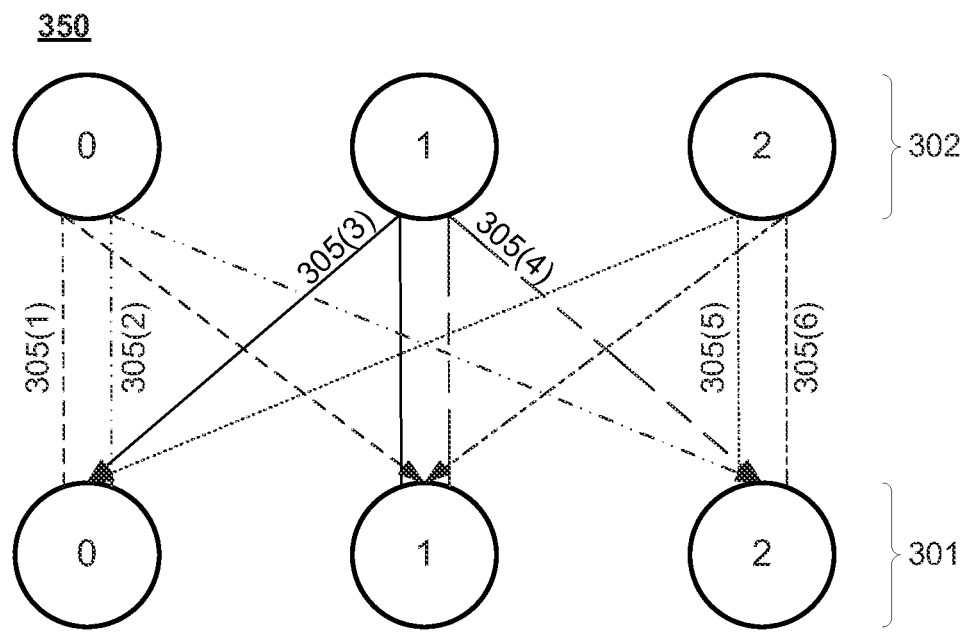
FIG. 3 is a flow map of flows traversing the network of FIG. 2, according to an illustrative implementation.

FIG. 3 is an example batch routing graph (BRG) 350 of batches traversing the network 300 shown in FIG. 2, according to an illustrative implementation. In the BRG 350, the first stage nodes 301 transmit flows 305 between one another via the second stage nodes 302. In some implementations, a group of flows 305 is referred to as a batch. An example batch may include the flows 305(3) and 305(5) that are both transmitted to the first stage node 301(0).

The BRG 350 includes three batches, each batch having two flows 305. For each batch, a first stage node 301 receives a flow 305 from the other two first stage nodes 301. More specifically, the BRG 350 includes a first batch with the flows 305(3) and 305(5) returning to the first stage node 301(0), a second batch with the flows 305(1) and 305(6) returning to the first stage node 301(1), and a third batch with the flows 305(2) and 305(4) returning to the first stage node 301(2). The specific flow paths for each of the flows 305 are provided in Table 1.

TABLE 1

Flows of FIG. 3

| Batch | Flow | Flow Path |
|---|---|---|
| 1 | 1 | node 301(1) → node 302(1) → node 301(0) |
| 1 | 2 | node 301(2) → node 302(2) → node 301(0) |
| 2 | 1 | node 301(0) → node 302(0) → node 301(1) |
| 2 | 2 | node 301(2) → node 302(2) → node 301(1) |
| 3 | 1 | node 301(0) → node 302(0) → node 301(2) |
| 3 | 2 | node 301(1) → node 302(1) → node 301(2) |

In some implementations, flows 305 (and batches) are transmitted by a node as part of a data center application employing a many-to-one communication pattern. Example data center applications that employ a many-to-one communication pattern include Map-Reduce, Hadoop, and Cassandra. In this communication pattern, a server node (e.g., a superblock 102 or first stage node 301) issues a data request (in the form of flows) to one or more worker nodes (also a superblock 102 or first stage node 301) via switches (e.g., a spineblock 120 or second stage node 302). Responsive to calculating and/or gathering the requested data, the worker nodes transmit responses data back to the server node. The responses are transmitted in the form of flows, and the collection of flows from worker nodes to the server node is termed a batch. In some implementations, the server node waits for a response from one or more of the worker nodes before proceeding to a new process. In some implementations, the server node waits for the return of all of the responses before proceeding to the next process. In some implementations, all of the responses refers to a portion of the flows 305 substantially close to 100%. For example, when waiting for all responses, a server may actually only wait for 99.7% of the responses to be returned. In some implementations, this is done to account for packet and other data loss that may occur in the network 300. In other implementations, the server node waits for a predetermined percent (or number) of responses that is meaningfully less than 100% (e.g., 95%, 90%, 80%, and 70%) before proceeding to the next process.

The batch completion time is the amount of time it takes for the server to receive the required percent (or number) of responses to proceed to a new process. Therefore, in some implementations, the batch completion time is dependent on the slowest responses (or flows) in a batch. In certain implementations, batch completion time is increased when bottlenecks occur in the network 300. Bottlenecks occur when the cumulative bandwidth usage of the flows 305 attempting to traverse a link 303 is greater than the link's 303 bandwidth capacity.

One of ordinary skill in the art will recognize the above described network 300 and BRG 350 are provided for illustrative purposes and in no way are intended to limit the scope of the disclosure. For example, in some implementations, the network 300 may include an unequal number of first stage nodes 301 and second stage nodes 302, batches with an unequal number of flows 305, and/or batches that are transmitted to an unequal number of second stage nodes 302.

In some implementations, the bandwidth allocation system 200 reduces batch completion time by substantially equally distributing bandwidth allocations to all the flows 305 of the batches traversing the network 300. In some implementations, substantially equal distribution of the bandwidth allocations means the bandwidth of the network 300 is divided by the number of batches, and each batch is provided about the resulting bandwidth allocation. In other implementations, the bandwidth allocation system 200 substantially equally distributes the bandwidth by dividing the total bandwidth by the number of flows 305.

In yet other implementations, batch completion time is reduced through the utilization of a max-min fairness throughput process. Given a network shared by batches of flows 305, throughput is said to be max-min fair if the $n^{th}$ percentile fastest flow of a batch cannot increase its throughput without decreasing the $n^{th}$ percentile fastest flow of another batch whose throughput is not greater than the throughput of the first batch.

In some implementations, the max-min fairness process may be divided into two categories based on the $n^{th}$ percentile (also referred to as the return requirement). In the first category the return requirement is 100%. In this implementation, a first stage node 301 awaits the return of a number of responses substantially close to 100% of the requested responses before proceeding to a new process. In the second category, the return requirement is less than 100%. For example, the return requirement may be set to 95%, 90%, 80%, or any value meaningfully less than 100%. The process is referred to as max-min tail fairness when the return requirement is less than 100%.

Figure 4:
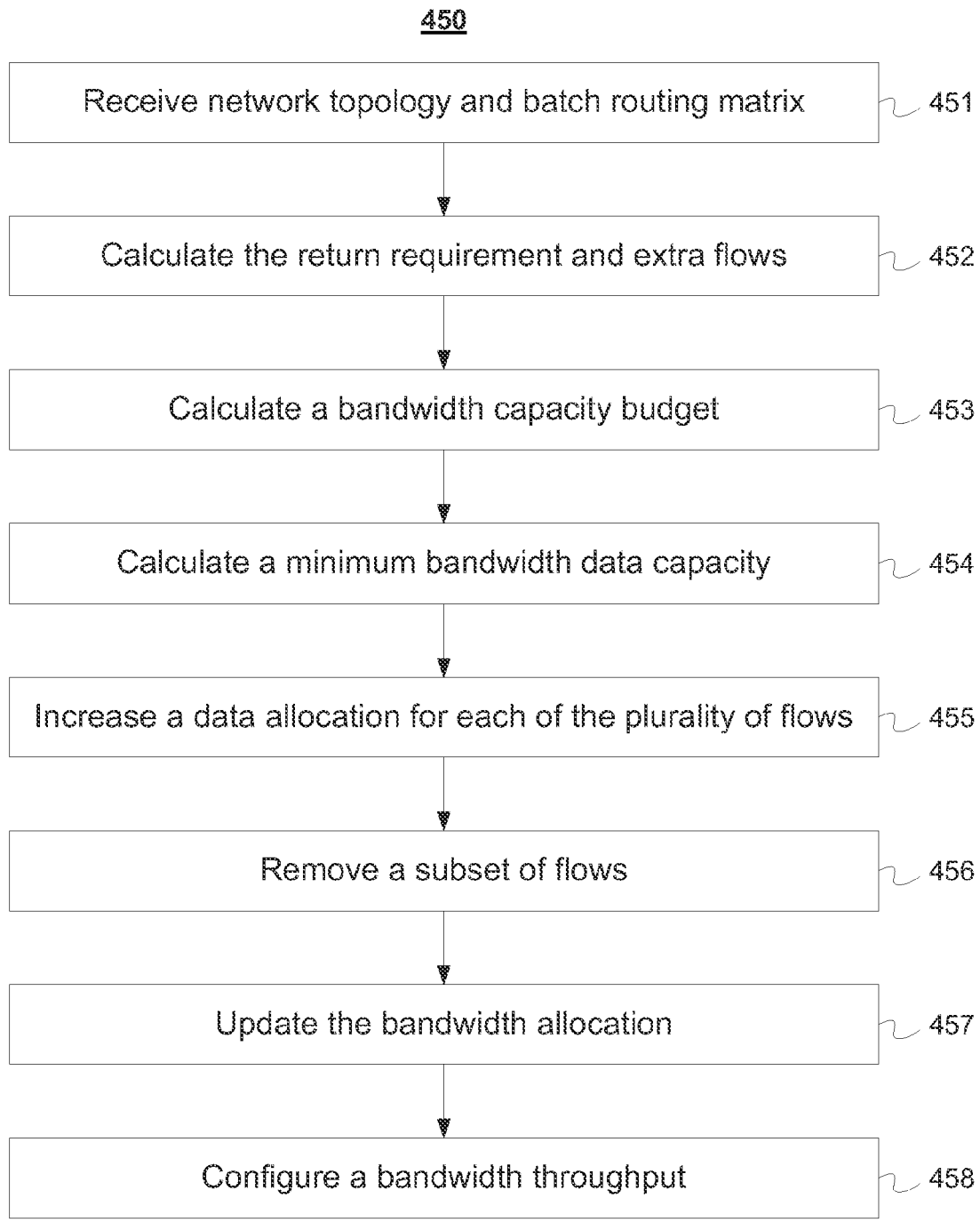
FIG. 4 is a flow chart of a method for reducing batch completion times, according to an illustrative implementation.

As described in greater detail in relation to the method of FIG. 4, equally distributing a link's bandwidth 303 to the batches traversing the network 300 may create bottlenecks. For example, assume the links 303 with heavy lines in network 300 have a capacity of 2 Gbps and the link 303(1) with the thin line has a capacity of 1 Gbps. Given this network configuration, and the batches depicted in the BRG 350 (and further detailed in Table 1), a bottleneck occurs between the first stage node 301(0) and the second stage node 302(0). The bottleneck occurs because the two flows 305 traversing the link 303(1) are each allocated only 0.5 Gbps (their equal share of the link 303(1)); however, each of the flows 305(1) and 305(2) is allocated 1.0 Gbps of bandwidth from the second stage node 302(0) to its final destination. Because the bandwidth entering the second stage node 302(0) is less than the bandwidth exiting the second stage node 302(0), the network 300 does not fully utilize the links 303(2) and 303(3) exiting the second stage node 302(0). The unutilized bandwidth of the links 303(2) and 303(3) is bandwidth that is not used to reduce batch completion time. Employing a max-min fairness process, the bandwidth allocation system 200 reduces the bandwidth allocated to the bottlenecked batches 2 and 3 to the rate limited by the bottleneck (i.e., 0.5 Gbps). The bandwidth allocation system 200 may then reallocate the extra bandwidth to batch 1. The reallocation reduces the batch completion time for batch 1 without increasing the batch completion time for batches 2 and 3. For example, and referring to FIG. 3 and Table 2, when a link's bandwidth is equally distributed, each flow 305 is allocated the below bandwidth by the bandwidth allocation system 200.

TABLE 2

Bandwidth allocation with fair share distribution

| Batch | Flow | Flow Path | Bandwidth Allocation |
|---|---|---|---|
| 1 | 1 | node 301(1) → node 302(1) → node 301(0) | 1 Gbps |
| 1 | 2 | node 301(2) → node 302(2) → node 301(0) | 1 Gbps |
| 2 | 1 | node 301(0) → node 302(0) → node 301(1) | 0.5 Gbps |
| 2 | 2 | node 301(2) → node 302(2) → node 301(1) | 1 Gbps |
| 1 | 1 | node 301(0) → node 302(0) → node 301(2) | 0.5 Gbps |
| 1 | 2 | node 301(1) → node 302(1) → node 301(2) | 1 Gbps |

Using the max-min fairness process, the bandwidth allocation system 200 may allocate the bandwidth as provided in Table 3

TABLE 3

Bandwidth allocation utilizing max-min fairness

| Batch | Flow | Flow Path | Bandwidth Allocation |
|---|---|---|---|
| 1 | 1 | node 301(1) → node 302(1) → node 301(0) | 1.5 Gbps |
| 1 | 2 | node 301(2) → node 302(2) → node 301(0) | 1.5 Gbps |
| 2 | 1 | node 301(0) → node 302(0) → node 301(1) | 0.5 Gbps |
| 2 | 2 | node 301(2) → node 302(2) → node 301(1) | 0.5 Gbps |
| 3 | 1 | node 301(0) → node 302(0) → node 301(2) | 0.5 Gbps |
| 3 | 2 | node 301(1) → node 302(1) → node 301(2) | 0.5 Gbps |

In this example, batches 2 and 3 are limited by a bottleneck, and therefore the bandwidth allocation system 200 can reallocate portions of their originally allocated bandwidth without affecting their total batch completion time. As shown above, the bandwidth can be reallocated to batch 1, wherein the increased bandwidth allocation reduces the total batch completion time.

As described further in relation to the method of FIG. 4, in general the method of reducing batch completion time using the max-min tail fairness process includes calculating the number of flows 305 required to be returned to meet the return requirement. For example, if a batch includes twenty flows and the return requirement is 90%, eighteen flows must be returned before the server can proceed to a new process. Two flows (or 10% of the total number of flows 305 in the batch) are considered extra flows. The number of extra flows for a batch n may be referred to as $E_n$. Next, the extra flows are removed from the batches by zeroing (or reducing) their bandwidth allocation. The extra flows consume bandwidth, but are not required to complete the batch. Therefore, in some implementations, if the flows are removed from the batch, the saved bandwidth may be reallocated to flows that are required for the completion of the batch. Finally, the extra bandwidth (also referred to as freed bandwidth) that results from zeroing the bandwidth allocation to the extra flows is provided to the remaining flows. Allocating additional bandwidth to the remaining flows increases the rate at which they traverse the network. Therefore the batch completion time is reduced.

FIG. 4 is a flow chart of a method 450 for reducing batch completion time. The method 450 is a specific implementation for reducing total batch completion time. In the method 450 batch completion time is reduced by utilizing a max-min tail fairness process. In general, the method 450 includes receiving a network topology and a batch routing matrix (step 451). Next, a return requirement and the number of extra flows in each batch is calculated (step 452). Then, a bandwidth capacity budget is calculated for each of the flows traversing the network (step 453). The minimum bandwidth capacity is determined (step 454) and a bandwidth allocation for each flow is increased to the minimum bandwidth capacity (step 455). The method also includes removing a subset of flows associated with the batch having the highest number of extra flows (step 456). The bandwidth capacity budget is recalculated responsive to the removed subset of flows and the bandwidth allocation for each flow is updated (step 457). Finally, the data throughput for the flows is implemented responsive to the bandwidth allocations (step 458).

As set forth above, the method 450 begins with the receipt of a network topology and batch routing matrix (step 451). As described above, the network topology and batch routing matrix may be received by the bandwidth allocation system 200. A network topology is a logical representation of the network's connectivity. For example, the network topology identifies how the first stage nodes 301 (e.g., superblocks 102) and second stage nodes 302 (e.g., spineblocks 120) are connected. In some implementations, the network topology includes the capacity of each of the links 303. The batch routing matrix is a matrix that identifies the number of flows 305 in each batch and the path each flow 305 takes through the network 300. In some implementations, the bandwidth allocation system 200 actively monitors the network 300 for changes to the network topology and/or the batch routing matrix. In other implementations, the first stage nodes 301 and/or second stage nodes 302 update the bandwidth allocation system 200 with batch and routing information when a new batch is created.

The method 450 continues with the calculation of the return requirement and the number of extra flows ($E_n$) for each batch (step 452). As described above, the return requirement and the number of extra flows is calculated responsive to the number of flows 305 a node requires to be returned before it can proceed to a new process. In some implementations, a node supplies the bandwidth allocation system 200 with the percent of flows 305 it requires to be returned before proceeding to a new process. In some implementations, the requirement is represented as a fixed number and/or a percentage of the total number of flows 305 in the batch. As described above, the percent may be referred to as the $n^{th}$ percentile max-min tail fairness objective. For example, a node may supply the bandwidth allocation system 200 with a $n^{th}$ percentile max-min tail fairness objective of 90%. Furthering this example, the batch routing matrix may indicate the node's batch includes 20 flows. Responsive to this information, the bandwidth allocation system 200 calculates the return requirement to be 20*0.90=18 flows and $E_n$=20*0.10=2 flows.

As set forth above, and also referring again to FIGS. 2 and 3, the method 450 continues with the calculation of a bandwidth capacity budget (B) for each flow traversing each link 303 (step 453). In some implementations, the capacity of a link 303 may be limited by flows already traversing the link 303. In these implementations, the link's 303 total capacity minus the used capacity is referred to as the residual capacity. If no flows 305 are flowing through a link 303, the link's 303 residual capacity is equal to its total capacity. In some implementations, a flow's 305 bandwidth capacity budget on a link 303 is calculated by dividing the residual capacity of the link 303 by the number of active flows traversing the link 303. For example, assume that the flow arrows 305 in FIG. 3 each represent ten flows. In this example, twenty flows traverse each of the three first stage node 301 to second stage node 302 links 303 (i.e., links 303(1), 303(5), and 303(9)) and ten flows traverse each of the six second stage node 302 to first stage node 301 links 303 (i.e., links 303(2), 303(3), 303(4), 303(6), 303(7), and 303(8)). In this example, the bandwidth capacity budget for the flows traversing the link 303(1) is 1 Gbps/20 flows=0.05 Gbps/flow, and the bandwidth capacity budget for flows 305 traversing the links 303(5) and 303(9) is 2 Gbps/20 flows=0.10 Gbps/flow. In step 453, the budgeted capacity calculation is repeated for all the links 303 in network 300.

Responsive to calculating the budgeted bandwidth capacities for each link 303, the minimum of the bandwidth capacity budgets (min(B)) across all of the flows 305 is determined (step 454). The minimum of the bandwidth capacity budgets (min(B)) is a bandwidth capacity that can be supported by all of the links 303 of the network. The minimum bandwidth capacity budget min(B) from the above example is 0.05 Gbps.

In this example, the minimum bandwidth capacity budget min(B) occurs at the link 303(1), which has the smallest total capacity. In some implementations, the batches traversing through the network 300 include a different number of flows. Accordingly, in some implementations, the minimum bandwidth capacity budget does not have to occur at the link 303 with the smallest bandwidth capacity. For example, consider the example where one flow traverses a first link with a residual bandwidth capacity of 1 Gbps and 100 flows traverse a second link with a residual bandwidth capacity of 10 Gbps. In this example, minimum bandwidth capacity budget min(B) occurs at the second link.

After the minimum bandwidth capacity budget min(B) is identified, a bandwidth allocation $D_a$ for each active flow is increased to the determined minimum bandwidth budget capacity min(B) (step 455). An active flow is a flow to which additional bandwidth can be allocated. In some implementations, a flow's bandwidth allocation $D_a$ is a running tally of the bandwidth the bandwidth allocation system 200 provides each flow 305 traversing the network at the conclusion of method 450. In some implementations, the bandwidth allocation system 200 stores the plurality of bandwidth allocations $D_a$ values in the database 240. In some implementations, a flow's bandwidth allocation $D_a$ is initially set to zero. Again continuing the above example, as min(B)=0.05 Gbps and all flows are active, each flow's bandwidth allocation $D_a$ is increased to 0.05 Gbps.

FIG. 5A provides a chart 500 summarizing the parameters of the above example at this stage of method 450. As described in the initial setup of this example, the chart 500 shows that each batch includes two flow paths, each of which are traversed by ten flows. Based on the calculations in the steps 452 and 454, the number of extra flows $E_n$ for each batch is 2 and all flows have an allocated bandwidth of 0.05 Gbps.

Responsive to increasing each active flow's bandwidth allocation, a subset of flows associated with the batch having the greatest number of extra flows $E_n$ is removed (step 456). Removing a flow 305 means the batch from which the flow 305 was removed has one less extra flow. In some implementations, the subset of flows is removed from the batch having the largest $E_n$ that traverses an exhausted link 303 (i.e., the link's residual capacity is 0). When each flow's bandwidth allocation $D_a$ is incremented by the minimum bandwidth capacity budget min(B) at least one link's 303 residual capacity is exhausted. In the above example, the minimum bandwidth capacity budget min(B) occurs at link 303(1). The link's 303(1) residual capacity of 1 Gbps divided among the 20 active flows 305 traversing the link 303(1) yields a B=0.05 (and in this case a min(B)=0.05). Accordingly, when all the flow's 305 bandwidth allocation $D_a$ is increased by the minimum bandwidth capacity budget min(B), the sum of the bandwidth capacity budgets across each link 303 equals 1 Gbps, and thus the residual capacity of the link 303(1), which was 1 Gbps, is exhausted. Responsive to removing a flow 305, the bandwidth allocation system 200 reduces the batch's $E_n$ by one to account for the flow's removal from the network 300. When an extra flow is removed from the network, its bandwidth allocation $D_a$ is set to 0 (previously, $D_a$=0.05 Gbps, in this example). The bandwidth allocation system 200 makes the free bandwidth available to the remaining flows 305 of the network 300.

Responsive to the freed bandwidth, the bandwidth capacity budget for each flow 305 is recalculated and the bandwidth allocation for each flow is updated (step 457). In some implementations, the recalculation of the bandwidth capacity budgets and the update of the flow's bandwidth allocation $D_a$ is done by repeating one or more of the steps 453, 454, 455, and 456.

In the above example, and further expanding on steps 453, 454, 455, and 456, twenty flows 305 (10 from above described batch 2 and 10 from above described batch 3) traverse the link 303(1). As described in relation to step 456, the residual capacity of the link 303(1) is exhausted, and a first flow 305 is removed from the batch with the largest $E_n$. In this example, both batch 2 and batch 3 have an $E_n$=2, and therefore, the flow to be removed can come for either of the batches. For the purpose of this example, assume the bandwidth allocation system 200 removes the flow from batch 2. Thus, the bandwidth allocation system 200 sets $E_1$=2, $E_2$=1, and $E_3$=2.

In some implementations, the bandwidth allocation system 200 iterates steps 454 and 455 while any $E_n$ exists with a non-zero value. At the next iteration, the bandwidth allocation system 200 determines min(B)=1/19 Gbps=0.052 Gbps.

FIG. 5B provides a chart 510 summarizing the parameters of the above example at this stage of method 450. As described above, one flow was removed from the exhausted path in batch 2. Accordingly, nine flows now traverse the node 301(0)→node 302(0)→node 301(1) path and $E_2$ has been reduced by one to account for the removed flow. The bandwidth allocation $D_a$ for each active flow is increased to 0.052 Gbps.

With the updated bandwidth allocation $D_a$ of 0.052 Gbps, the link 303(1) is again exhausted. In this iteration, a flow is removed from the batch with the largest $E_n$ and each batch's $E_n$ is updated. In this example, the database 240 now stores $E_1$=2, $E_2$=1, and $E_3$=1. The bandwidth allocation system 200 continues to reiterate the steps 454 and 455 until all $E_n$=0. When a batch's number of extra flows $E_n$=0, the batch has no more extra flows 305 to spare and all remaining flows 305 must be returned for the requesting node to proceed to a new process. In some implementations, when a batch has no more flows to spare (i.e., $E_n$=0) the greatest amount of bandwidth has been allocated to the required flows of the batch.

In some implementations, an $E_n$=0 indicates the batch has encountered a bottleneck. In response to the flow of the batch encountering a bottleneck or $E_n$=0, the bandwidth allocation system 200 sets all remaining flows 305 of the batch to inactive. When a flow 305 is "inactive," the bandwidth allocation system 200 fixes the flow's bandwidth allocation $D_a$ to its current bandwidth allocation $D_a$. Additionally, the flow's bandwidth allocation $D_a$ is no longer updated as the bandwidth allocation system 200 repeats steps 454, 455, and 456. As described above, the batch completion time of a batch is responsive to the slowest flow in the batch.

Accordingly, in some implementations, reducing the flow rate of flows 305 in a batch to the rate of the slowest flow in the batch does not increase total batch completion time. Similarly, increasing the rate of the faster flows in a batch (by allocating additional bandwidth to the faster flows) does not decrease total batch completion time. When fixing the bandwidth allocation $D_a$ for all flows 305 in a batch responsive to a first flow of a batch encountering a bottleneck allows the bandwidth allocation system 200 to not over allocate bandwidth to the remaining flows 305 of the batch. In some implementations, the first bottlenecked flow is the rate limiting flow for the batch.

Continuing the above example, and further expanding step upon step 457, the bandwidth allocation system 200 continues to repeat steps 453, 454, 455 and 456, until $E_1$=2, $E_2$=0, and $E_3$=0. FIG. 5C provides a chart 520 summarizing the network parameters at this stage in the method 450. At this point in the method 450, each minimum bandwidth capacity budget min(B) occurred at the link 303(1), and the bandwidth allocation system 200 has removed two flows 305 from batch 2 and two flows 305 from batch 3 that originally traversed the link 303(1) (i.e., the bandwidth allocation system 200 reduced the number of flows 305 traversing the link 303(1) from node 301(0) to node 302(1) from twenty flows to sixteen flows). Repeating steps 454 and 455, the bandwidth allocation system 200 sets the bandwidth allocation $D_a$ of the remaining flows 305 in batch 2 and batch 3 to $D_a$=1 Gbps/16 flows=0.0625 Gbps/flow. At this point in method 450, as, $E_2$=$E_3$=0, all the flows 305 of batch 2 and batch 3 are set to inactive, and their bandwidth allocation $D_a$ is fixed to 0.0625 Gbps.

The bandwidth allocation system 200 continues repeating steps 454, 455, and 456 until $E_1$=0. In the above example, the flows 305 of batch 1 traversing links 303(5) and 303(9) share the links 303(5) and 303(9) with flows 305 from batches 2 and 3. Based on step 456, the bandwidth allocation system 200 did not remove any batch 2 and batch 3 flows 305 traversing the links 303(5) and 303(9). Accordingly, the residual capacity of the links 303(5) and 303(9) is 1.375 Gbps (the original 2 Gbps capacity minus the bandwidth capacity consumed by the ten 0.0625 Gbps flows from batches 2 and 3 traversing links 303(9) and 303(5), respectively).

The bandwidth allocation system 200 continues to divide the available bandwidth to the active flows by repeating the above described steps. Summarizing the next two iterations, the bandwidth allocation system 200 removes one flow from the first flow path of batch 1 and then one flow from the second flow path of batch 1. As provided in the parameter chart 530 of FIG. 5D, the bandwidth allocation $D_a$ for the flows 305 of batch 1 is $D_a$=1.375 Gbps/9 flows=0.1528 Gbps/flow. In this example, $E_1$=0, $E_2$=0, and $E_3$=0, thus all flows 305 are marked as inactive, and the bandwidth allocation system 200 continues to step 458 of method 450.

Referring back to the method 450, the bandwidth allocation system 200 then implements the above calculated bandwidth allocations as link throughputs (step 458). In some implementations, the bandwidth allocations are implemented by the network dissemination module 230. For example, the network dissemination module 230 may configure the nodes of the network 300 to transmit flows responsive to the calculated bandwidth allocations by setting rate limiters to control the flows 305 traversing the network 300. In some implementations, the bandwidth allocation system 200 repeats the above described method 450 responsive to a new batch traversing the network 300. In other implementations, the bandwidth allocation system 200 repeats the method 450 on a predetermined schedule and/or when network 300 utilization is above a predetermined level. For example, the bandwidth allocation system 200 allocate bandwidth according to the method 450 when the network usages exceeds 90% of its total bandwidth capacity.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for reducing overall batch completion time of distributed computations, wherein the distributed computations are computed by a plurality of nodes connected by a plurality of data links, the system comprising:
    a memory to store processor-executable instructions; and
    one or more processors coupled to the memory, wherein execution of the processor-executable instructions by the one or more processors cause the one or more processors to:
        receive a network topology of the plurality of data links connecting the plurality of nodes, a response objective, and batch routing data for a plurality of batches, wherein the response objective indicates a number of flows that are to be returned for a batch to be considered complete;
        determine bandwidth throughputs for each of the data links by:
            calculating a number of extra flows for the plurality of batches responsive to the response objective;
            calculating a capacity budget for each of a plurality of flows in the plurality of batches;
            calculating a bandwidth capacity that can be supported by the plurality of data links responsive to the capacity budget;
            increasing a bandwidth allocation for each of the plurality of flows to the determined bandwidth;
            removing a subset of flows associated with one of the batches; and
            updating the bandwidth allocation responsive to the removed subset of flows; and
        implement a bandwidth throughput for each of the plurality of data links responsive to the updated bandwidth allocation.

2. The system of claim 1, wherein processor-executable instructions further cause the one or more processors to iteratively determine the bandwidth throughputs.

3. The system of claim 1, wherein processor-executable instructions further cause the one or more processors to calculate the capacity budget for each of the plurality of flows at each of the plurality of data links.

4. The system of claim 1, wherein the response objective is less than 100% of the batch's flows.

5. The system of claim 1, wherein the removed subset of flows are removed from the batch having the highest number of extra flows.

6. The system of claim 1, wherein processor-executable instructions further cause the one or more processors to initially set the bandwidth allocation for each of the plurality of flows to zero.

7. The system of claim 1, wherein the batch routing data indicates a subset of nodes that each of the plurality of flows traverses.

8. A computer-implemented method for reducing overall batch completion time of distributed computations, wherein the distributed computations are computed by a plurality of computing devices connected by a plurality of data links, the method comprising:
    receiving a network topology of the plurality of data links connecting the plurality of computing devices, a response objective, and batch routing data for a plurality of batches, wherein the response objective indicates a number of flows that are to be returned for a batch to be considered complete;
    determining bandwidth throughputs for each of the data links by:
        calculating a number of extra flows for the plurality of batches responsive to the response objective;
        determining a capacity budget for each of a plurality of flows in the plurality of batches;
        determining a bandwidth capacity that can be supported by the plurality of data links;
        increasing a bandwidth allocation for each of the plurality of flows to the determined bandwidth capacity;
        removing a subset of flows associated with the one of the batches; and
        updating the bandwidth allocation responsive to the removed subset of flows; and
    implement a bandwidth throughput for each of the plurality of data links responsive to the updated bandwidth allocation.

9. The method of claim 8, further comprising iteratively determining the bandwidth throughputs.

10. The method of claim 8, further comprising calculating the capacity budget for each of the plurality of flows at each of the plurality of data links.

11. The method of claim 8, wherein the response objective is less than 100% of the batch's flows.

12. The method of claim 8, further comprising initially setting the bandwidth allocation for each of the plurality of flows to zero.

13. The method of claim 8, wherein the removed subset of flows are removed from the batch having the highest number of extra flows.

14. The method of claim 8, wherein the batch routing data indicates a subset of computing devices that each of the plurality of flows traverses.

15. A non-transitory computer readable storage medium having instructions encoded thereon which, when executed by a processor, cause the processor to perform a method for reducing overall batch completion time of distributed computations, wherein the distributed computations are computed by a plurality of computing devices connected by a plurality of data links, the method comprising:

receiving a network topology of the plurality of data links connecting the plurality of computing devices, a response objective, and a batch routing matrix for a plurality of batches, wherein the response objective indicates a number of flows that must be returned for a batch to be marked complete;

determining bandwidth throughputs for each of the data links by:
- calculating a number of extra flows for the plurality of batches responsive to the response objective;
- determining a capacity budget for each of a plurality of flows in the plurality of batches;
- determining a bandwidth capacity that can be supported by the plurality of data links;
- increasing a bandwidth allocation for each of the plurality of flows to the determined bandwidth capacity;
- removing a subset of flows associated with the one of the batches; and
- updating the bandwidth allocation responsive to the removed subset of flows; and implement a bandwidth throughput for each of the plurality of data links responsive to the updated bandwidth allocation.

16. The non-transitory computer readable storage medium of claim 15, wherein the method further comprises iteratively determining the bandwidth throughputs.

17. The non-transitory computer readable storage medium of claim 15, wherein the method further comprises calculating the capacity budget for each of the plurality of flows at each of the plurality of data links.

18. The non-transitory computer readable storage medium of claim 15, wherein the response objective is less than 100% of the batch's flows.

19. The non-transitory computer readable storage medium of claim 15, wherein the removed subset of flows are removed from the batch having the highest number of extra flows.

20. The non-transitory computer readable storage medium of claim 15, wherein the method further comprises initially setting the bandwidth allocation for each of the plurality of flows to zero.

* * * * *